United States Patent
Inabayashi et al.

[11] Patent Number: 6,063,510
[45] Date of Patent: May 16, 2000

[54] ALUMINUM ALLOY BRAZING SHEET FOR USE IN VACUUM BRAZING

[75] Inventors: Yoshihito Inabayashi, Utsunomiya; Hiroshi Kano, Imaichi; Noboru Soga, Kanuma; Haruhiko Miyachi, Okazaki; Eiichi Torigoe, Kariya, all of Japan

[73] Assignee: The Furukawa Electric Co., Ltd., Japan

[21] Appl. No.: 08/811,047

[22] Filed: Mar. 4, 1997

[30] Foreign Application Priority Data

| Mar. 5, 1996 | [JP] | Japan | 8-083560 |
| Mar. 6, 1996 | [JP] | Japan | 8-048917 |

[51] Int. Cl.⁷ .................... B32B 15/20; F28F 21/08
[52] U.S. Cl. .......................... 428/654; 428/933; 165/133; 165/905
[58] Field of Search .................. 428/654, 933; 165/180, 133, 134.1, 905

[56] References Cited

U.S. PATENT DOCUMENTS

| 4,098,957 | 7/1978 | Vernam et al. | 428/654 |
| 4,146,163 | 3/1979 | Anderson et al. | 428/654 |
| 4,146,164 | 3/1979 | Anderson et al. | 428/654 |
| 4,209,059 | 6/1980 | Anthony et al. | 428/654 |
| 4,211,827 | 7/1980 | Pryor et al. | 428/654 |
| 5,011,547 | 4/1991 | Fujimoto et al. | 428/654 |
| 5,125,452 | 6/1992 | Yaumauchi et al. | 428/654 |
| 5,292,595 | 3/1994 | Yamauchi et al. | 428/654 |
| 5,350,436 | 9/1994 | Takezoe et al. | 75/314 |
| 5,476,725 | 12/1995 | Papich et al. | 428/654 |
| 5,744,255 | 4/1998 | Doko et al. | 428/654 |

*Primary Examiner*—John J. Zimmerman
*Attorney, Agent, or Firm*—Lorusso & Loud

[57] ABSTRACT

The present invention relates to an Al alloy brazing sheet for use in vacuum brazing, which is applied to manufacture a heat exchanger having a tank portion and a refrigerant passage respectively formed by bonding press-formed brazing sheets together by means of vacuum brazing. The brazing sheet includes an Al alloy core material having a composition consisting of 0.5 to 2.0 mass % (hereinafter abbreviated simply as %) of Mn, 0.1 to 1.0% of Cu, 0.05 to 0.5% of Mg and 0 to 0.3%. of Ti, with the remainder being Al and inevitable impurities. An Al—Si—Mg alloy brazing filler metal or an alloy brazing filler metal prepared by further adding 0.05 to 1.0% of Sn to the Al—Si—Mg alloy brazing filler metal, is clad on both surfaces of the sheet to a thickness of 5 to 20% the total sheet thickness. An intermediate layer consisting of an Al alloy having a composition consisting of 0.5 to 2.0% of Mn, 0.05 to 0.5% of Mg and 0 to 0.3% of Ti, with the remainder being Al and inevitable impurities, is provided between the core material and the brazing filler metal corresponding to the outside of the tank portion and the refrigerant passage and has a thickness of 30 μm or more, preferably 80 μm or more, and 35% or less of the total sheet thickness. This Al alloy brazing sheet provides excellent outside corrosion resistance for the heat exchanger.

7 Claims, 2 Drawing Sheets

180 # ALUMINUM ALLOY BRAZING SHEET FOR USE IN VACUUM BRAZING

BACKGROUND OF THE INVENTION

1. Field of the Invention

This invention relates to an Al alloy brazing sheet which is excellent in corrosion resistance and is suitably used for assembling an Al alloy heat exchanger or the like for automobiles and various industrial purposes by bonding with brazing, particularly, vacuum brazing.

Incidentally, in this specification, the components of an Al alloy are all expressed by mass percent, which will be hereinafter abbreviated simply as %.

2. Description of the Prior Art

Brazing is effective in manufacturing an Al alloy structure of a complicated shape. In particular, vacuum brazing is extensively used, since this method requires no flux and is free from any environmental pollution problems. The vacuum brazing uses a brazing sheet in which one or both surfaces of a core material consisting of Al or Al alloy are clad with an Al alloy brazing filler metal as a cladding material. With this method, the brazing sheet is press-formed into members of various shapes, and these members are assembled in a predetermined structure such as a heat exchanger, for instance, which is then brazed by heating in a vacuum.

As for a brazing sheet for use in vacuum brazing, various Al alloys for a core material and various Al alloy brazing filler metals for a cladding material have been developed. At present, these materials are standardized by JIS-Z-3263 and JIS-H-4000.

In the case of an ordinary brazing sheet for use in vacuum brazing to manufacture a heat exchanger, JIS 3003 alloy (including, as a typical alloy, Al—Cu—Mn alloy with Cu content of 0.15% and Mn content of 1.1%), JIS 3005 alloy (including, as a typical alloy, Al—Mn—Mg alloy with Mn content of 1.1% and Mg content of 0.4%) and JIS 3105 alloy (including, as a typical alloy, Al—Mn—Mg alloy with Mn content of 0.6% and Mg content of 0.6%) are used for the core material, while JIS 4004 alloy brazing filler metal (including, as a typical material, Al—Si—Mg alloy with Si content of 10% and Mg content of 1.5%) and JIS 4104 alloy brazing filler metal (including, as a typical material, Al—Si—Mg—Bi alloy with Si content of 10%, Mg content of 1.2% and Bi content of 0.1%) are used for the cladding material. The brazing sheet has a thickness of about 0.3 to 1.5 mm, and one or both surfaces of the core material are clad with a brazing filler metal having a thickness 5 to 15% per side of the total thickness.

Such a brazing sheet is manufactured into an Al alloy heat exchanger having a hollow structure such as an evaporator of drawn-cup type, an oil cooler or a radiator. An evaporator so drawn-cup type 10 as shown in FIG. 4 for instance, is manufactured as follows. A brazing sheet, in which both surfaces of the above Al alloy core material are clad with the above Al alloy brazing filler metal, is manufactured into a refrigerant passage constituent member 1 as shown in FIGS. 2 and 3 by means of press-forming, and this member 1 is arranged in layers as shown in FIG. 4. Then, corrugated fins 2 are attached between the layered members 1, and side plates 6, 6', a refrigerant inlet pipe 7 and a refrigerant outlet pipe 8 are arranged and assembled into a core which is then brazed in a vacuum. Brazing in this case is carried out by heating up to about 873K in a vacuum of about $1.3 \times 10^3$ to $1.3 \times 10^{-2}$ Pa.

With a tendency to reduce the weight of automobiles, there have been demands that the thickness of materials for their heat exchangers should be reduced. On the other hand, automobiles are used in a variety of environments, and therefore, need materials which can withstand the various conditions encountered by automobiles. In particular, in case of a heat exchanger of drawn-cup type having no sacrificial layer, corrosion resistance of a core material of a brazing sheet is the most important characteristic. Thus, it is desirable to develop corrosion resistant brazing sheets.

The corrosion resistance of a brazing sheet is related to the distribution of alloying elements across the thickness of the material. However, alloying elements such as Cu and Zn, which are effective in corrosion resistance of a material, are distributed to be symmetrical with each other on the sheet surface side and its reverse side about the center of the sheet thickness when heating for brazing is carried out. Therefore, when the surface of a brazing sheet causes pitting corrosion, a material, which makes progress of pitting corrosion on the surface side slower than that at the center of the thickness, starts acceleration of pitting corrosion subsequent to that at the center of the thickness. Thus, it is not too much to say that a portion corresponding to half of the thickness makes a contribution to the improvement of corrosion resistance. Improvement of penetration life by adding alloying elements to a core material has its limit.

Since Cu added makes the potential of aluminum noble, Cu is added to the core material of a brazing sheet for the purpose of improving the corrosion resistance. However, Cu added to the core material is diffused into a brazing filler metal which has melted in heating for brazing. Cu further forms an eutectic and is concentrated when the brazing filler metal is solidified after heating for brazing. Therefore, the more Cu the core material of a brazing sheet contains, the more the corrosion of a layer resulting from resolidifying the brazing filler metal is accelerated. Accordingly, the quantity of alloying elements such as Cu added to the core material of the brazing sheet is limited for the improvement of corrosion resistance.

Conventionally, a four or five-layer brazing sheet having an intermediate layer between a core material and a brazing filler metal has been used for the purpose of preventing alloying elements of the brazing filler metal from being diffused into the core material, or preventing alloying elements of the core material from being diffused into the brazing filler metal in heating for brazing. For instance, brazing sheets disclosed in Japanese Patent Toku-Kai-Hei 2-30394, 1-208432 and 5-65582 or the like correspond to such a four or five-layer brazing sheet.

However, these brazing sheets as disclosed above do not sufficiently improve the exterior corrosion resistance of a heat exchanger (i.e., an evaporator of drawn-cup type or the like).

SUMMARY OF THE INVENTION

It is an object of the present invention to improve the exterior side corrosion resistance of a heat exchanger by solving the above problems which occur when a brazing sheet is manufactured into a heat exchanger by means of vacuum brazing. More specifically, its object is to provide an Al alloy brazing sheet which has excellent exterior side corrosion resistance.

The present inventors have studied exterior side corrosion resistance of a heat exchanger with a view toward solving the above problems, and as a result, they have discovered that an intermediate layer should be provided between a brazing filler metal and a core material to prevent alloying elements of the brazing filler metal from being diffused into the core material and to prevent alloying elements (i.e., Cu or the like) of the core material from being diffused into the brazing filler metal in heating for brazing, and the alloy composition, thickness and the percentage of the total thickness of the intermediate layer are largely related to the corrosion resistance of a brazing sheet and are important to the corrosion resistance of the brazing sheet.

In order to attain the above object, a first embodiment of the present invention relates to an Al alloy brazing sheet for use in vacuum brazing, which is applied to manufacture a heat exchanger having a tank portion and a refrigerant passage respectively formed by bonding press-formed brazing sheets together by means of vacuum brazing, and comprises an Al alloy core material having a composition consisting of 0.5 to 2.0% of Mn, 0.1 to 1.0% of Cu, 0.05 to 0.5% of Mg and 0 to 0.3% of Ti, with the remainder being Al and inevitable impurities, an Al—Si—Mg alloy brazing filler metal, with which both surfaces of the Al alloy core material are clad to 5 to 20% of the total thickness of the sheet, and an intermediate layer consisting of an Al alloy having a composition consisting of 0.5 to 2.0% of Mn, 0.05 to 0.5% of Mg and 0 to 0.3% of Ti, with the remainder being Al and inevitable impurities, wherein the intermediate layer is provided between the core material and the brazing filler metal corresponding to the outer surface of the tank portion and that of the refrigerant passage, and the intermediate layer has a thickness of 30 $\mu$m or more and 35% or less of the total thickness.

A second embodiment of the present invention relates to an Al alloy brazing sheet for use in vacuum brazing, which is applied to manufacture a heat exchanger having a tank portion and a refrigerant passage respectively formed by bonding press-formed brazing sheets together by means of vacuum brazing, and comprises an Al alloy core material having a composition consisting of 0.5 to 2.0% of Mn, 0.1 to 1.0% of Cu, 0.05 to 0.5% of Mg and 0 to 0.3% of Ti, with the remainder being Al and inevitable impurities, an Al—Si—Mg alloy brazing filler metal, with which both surfaces of the Al alloy core material are clad to 5 to 20%, per side, of the total thickness, and an intermediate layer consisting of an Al alloy having a composition consisting of 0.5 to 2.0% of Mn, 0.05 to 0.5% of Mg, 0 to 0.3% of Ti and one or both of 0.05 to 0.5% of Sn and 0.05 to 10.0% of Zn, with the remainder being Al and inevitable impurities, wherein the intermediate layer is provided between the core material and the brazing filler metal corresponding to the outer surface of the tank portion and the refrigerant passage, and the intermediate layer has a thickness of 30 $\mu$m or more and 35% or less of the total thickness.

A third embodiment of the present invention is preferable to the first and second embodiments of the present invention, and relates to an Al alloy brazing sheet for use in vacuum brazing, in which the thickness and percentage total thickness of the intermediate layer in the first and second embodiments of the present invention are, respectively, 80 $\mu$m or more and 35% or less.

Further, a fourth embodiment of the present invention relates to an Al alloy brazing sheet for use in vacuum brazing, in which 0.05 to 1.0% of Sn is further added to the Al—Si—Mg alloy brazing filler metal in the first and second embodiments of the present invention.

Hereinafter will be described the present invention in detail.

(1) First Embodiment

A description will now be given of the Al alloy brazing sheet according to the first embodiment of the present invention.

(i) Core Material

A description will now be given of the functions of alloying elements added to an Al alloy used for the core material of the brazing sheet and the reasons for the ranges given.

0.1 to 1% of Cu is added for improving the corrosion resistance. Cu content less than its lower limit does not show its satisfactory effects. On the other hand, Cu content more than its upper limit easily causes intergranular corrosion, and also increases the quantity of brazing filler metal diffused into the core material, resulting in degradation of corrosion resistance. Accordingly, Cu content is limited to 0.1 to 1.0%, preferably to 0.15 to 0.5%.

0.5 to 2.0% of Mn is added for enhancing the strength. Mn content less than its lower limit is less effective in enhancing the strength. On the other hand, Mn content more than its upper limit increases the quantity of brazing filler metal diffused into the core material in heating for brazing, resulting in degradation of brazing properties and corrosion resistance. Accordingly, Mn content is limited to 0.5 to 2.0%, preferably to 0.8 to 1.5%.

0.05 to 0.5% of Mg is added for enhancing the strength. Mg content less than its lower limit is less effective in enhancing the strength. On the other hand, Mg content more than its upper limit increases the quantity of brazing filler metal diffused into the core material in heating for brazing, resulting in degradation of brazing properties and corrosion resistance. Accordingly, Mg content is limited to 0.05 to 0.5%, preferably to 0.1 to 0.3%.

0 to 0.3% of Ti is added for improving the corrosion resistance. The meaning of the range of 0 to 0.3% is as follows. Namely, 0% (i.e. less than 0.01%) means that Ti is not added at all. Ti content is limited to 0.01 to 0.3% when added. Ti content more than 0.3% produces coarse Ti crystal, and damages the corrosion resistance. Accordingly, Ti content is limited to 0 to 0.3%. Whether or not Ti is to be added is decided according to the intended use of the product. Incidentally, Ti content is preferably limited to about 0.05 to 0.20% when added.

Other alloying elements contained in the core material include inevitable impurities such as Si, Fe, Cr and Zn. If the contents of these impurities are respectively within the normal tolerance, namely, Si, Fe, Cr and Zn contents are respectively regulated to be 0.6% or less, 0.7% or less, 0.20% or less and 0.40% or less, no problems need arise. However, each of the Si and Fe contents is preferably regulated to be 0.20% or less.

(ii) Material of Intermediate Layer

A description will now be given of the alloying elements added to the Al of the intermediate layer material of the Al alloy brazing sheet according to the present invention and the reasons why the contents thereof are limited to the specified ranges.

0.5 to 2.0% of Mn is added for enhancing the strength. Mn content less than its lower limit is less effective in enhancing the strength. On the other hand, Mn content more than its upper limit increases the quantity of brazing filler metal diffused into the core material in heating for brazing, resulting in degradation of brazing properties and corrosion resistance. Accordingly, Mn content is limited to 0.5 to 2.0%, preferably to 0.8 to 1.5%.

0.05 to 0.5% of Mg is added for enhancing the strength. Mg content less than its lower limit is less effective in enhancing the strength. On the other hand, Mg content more than its upper limit increases the quantity of brazing filler metal diffused into the core material in heating for brazing, resulting in degradation of brazing properties and corrosion resistance. Accordingly, Mg content is limited to 0.05 to 0.5%, preferably to 0.1 to 0.3%.

0 to 0.3% of Ti is added for improving the corrosion resistance. The meaning of the range of 0 to 0.3% is as follows. Namely, 0% (i.e., less than 0.01%) means that Ti is not added at all. Ti content is limited to 0.01 to 0.3% when added. Ti content more than 0.3% produces coarse Ti crystal, and damages the corrosion resistance. Accordingly, Ti content is limited to 0 to 0.3%, preferably to 0.05 to 0.2% when added.

If Cu is added to the intermediate layer, Cu is diffused from the intermediate layer into the brazing filler metal on the outer side in heating for brazing. When the brazing filler metal is solidified, Cu comes into an eutectic part and is concentrated, resulting in degradation of corrosion resistance. Accordingly, Cu is not added to the intermediate layer at all.

Other alloying elements in the Al alloy material of the intermediate layer include inevitable impurities such as Si, Fe, Cr, Zn and Cu. If the contents of these impurities are respectively within the normal tolerance, i.e., Si, Fe, Cr, Zn and Cu contents are respectively regulated to be 0.6% or less, 0.7% or less, 0.20% or less, 0.40% or less and 0.05% or less, no problems need arise relative to workability and corrosion resistance or the like. However, each of Si and Fe contents is preferably regulated to be 0.20% or less.

According to the brazing sheet of the present invention, the intermediate layer consisting of the above Al alloy is provided on one side of the core material, namely, on the side corresponding to the outside of a tank portion and a refrigerant passage of a heat exchanger. Further, the intermediate layer is clad with the brazing filler metal.

Ordinarily, the other surface of the core material is directly clad with the brazing filler metal, but not in all cases.

The intermediate layer is provided on the side corresponding to the outside of the tank portion and the refrigerant passage, since the outside of the tank portion and the refrigerant passage should withstand a more severe corrosive environment.

The thickness of the intermediate layer of the Al alloy brazing sheet according to the present invention is set to be 30 μm or more. When the thickness of the intermediate layer is less than 30 μm, Cu contained in the core material is diffused into the brazing filler metal through the intermediate layer in heating for brazing. When the brazing filler metal melts and is solidified, Cu diffused into the brazing filler metal comes into an eutectic portion and is concentrated, resulting in degradation of corrosion resistance.

The thickness of the intermediate layer is set to be 35% or less of the total thickness. When the thickness of the intermediate layer relative to the total thickness is too large, the strength of the material is degraded to make it hard to press-form the material. Further, in this case, a portion which provides sacrificial corrosion prevention of the core material becomes too large, and when the corrosion is in the advanced stage, the remaining sheet thickness becomes too small to stand the internal pressure required of a heat exchanger. Accordingly, the thickness of the intermediate layer is set to be 30 μm or more and 35% or less of the total thickness.

(iii) Al—Si—MQ Alloy Brazing Filler Metal

The brazing filler metal used in the present invention is not particularly limited. Use may be made of an Al—Si—Mg alloy brazing filler metal normally applied to vacuum brazing, such as JIS 4004 alloy brazing filler metal (including Al—Si—Mg alloy with Si content of 10% and Mg content of 1.5%, a typical alloy composition) and JIS 4104 alloy brazing filler metal (including Al—Si—Mg—Bi alloy with Si content of 10%, Mg content of 1.2%, and Bi content of 0.1%, a typical alloy composition).

Further, a normal thickness, i.e., a thickness of 5 to 20% per side relative to the total thickness may be used for the brazing filler metal.

In the present invention, both surfaces of the sheet are clad with the brazing filler metal.

(iv) Sectional Structure of Brazing Sheet

The Al alloy brazing sheet according to the present invention is constituted as described above, and has the sectional structure as shown in FIG. 1.

Namely, this brazing sheet has a four-layer structure, in which the side C of the Al alloy core material 5 corresponding to the outside of the tank portion and the refrigerant passage of the heat exchanger is clad with a brazing filler metal 3 through an intermediate layer 4 consisting of the above Al alloy, and the other side D (i.e., the side corresponding to the inner surface) of the core material 5 is clad with a brazing filler metal 3'.

(2) Second Embodiment

A description will now be given of the Al alloy brazing sheet according to the second embodiment of the present invention.

The Al alloy brazing sheet according to the second embodiment of the present invention has similar characteristics, i.e., the composition of the core material, the thickness of the intermediate layer material, the composition of the brazing filler metal and the structure of the sheet and the like as those of the first embodiment, except that the Al alloy of the intermediate layer material has a composition consisting of 0.5 to 2.0% of Mn, 0.05 to 0.5% of Mg, 0 to 0.3% of Ti, and one or both of 0.05 to 0.5% of Sn and 0.05 to 10.0% of Zn, with the remainder being Al and inevitable impurities.

As the result of further adding one or both of Sn and Zn, in addition to the Mn, Mg and Ti of the first embodiment, the Al alloy of the intermediate layer material according to the second embodiment further improves the corrosion resistance of the brazing sheet.

0.05 to 0.5% of Sn is added for improving the corrosion resistance of a material by making the potential less noble to improve sacrificial corrosion resistance of the core material. Sn content less than its lower limit is less effective in improving the corrosion resistance. On the other hand, Sn content more than its upper limit degrades the self corrosion resistance of the intermediate layer. Accordingly, Sn content is limited to 0.05 to 0.5%, preferably to 0.05 to 0.2%.

0.05 to 10.0% of Zn is added for improving the corrosion resistance of a material by making the potential less noble to improve sacrificial corrosion resistance of the core material, similarly to the case of Sn. Zn content less than its lower limit is less effective in improving the corrosion resistance. On the other hand, Zn content more than its upper limit degrades the self corrosion resistance of the intermediate layer. Accordingly, Zn content is limited to 0.05 to 10.0%, preferably to 3.0 to 6.0%.

Incidentally, one or both of elemental Sn and Zn are added. Although only one of Sn and Zn may have the effect of improving the corrosion resistance, it may be good to add both of Sn and Zn simultaneously.

(3) Third Embodiment

The third embodiment of the present invention is preferable to the first and second embodiments of the present invention regarding the thickness of the intermediate layer material.

Namely, the third embodiment of the present invention is an Al alloy brazing sheet, in which the thickness of the intermediate layer is 80 μm or more and 35% or less of the total thickness.

The intermediate layer is set to have a thickness of 80 μm or more and 35% or less of the total thickness, to provide excellent corrosion resistance.

(4) Fourth Embodiment

The fourth embodiment of the present invention is an Al alloy brazing sheet, in which 0.05 to 0.5% of Sn is further added to the Al—Si—Mg alloy brazing filler metal of the Al alloy brazing sheet in the first to third embodiments of the present invention to further improve the corrosion resistance.

Sn comes into an eutectic portion when the brazing filler metal is solidified after heating for brazing. Thus, Sn neutralizes the potential of the eutectic and makes it possible to further improve the corrosion resistance of the surface of the brazing sheet after heating for brazing.

Sn content less than its lower limit does not show its satisfactory effects. On the other hand, Sn content more than its upper limit degrades the corrosion resistance of the brazing sheet surface after heating for brazing, resulting in acceleration of corrosion. Accordingly, Sn content is limited to 0.05 to 05%, preferably to 0.05 to 0.2%.

Incidentally, in the case of adding Sn (0.05 to 0.5%) to the Al—Si—Mg alloy brazing filler metal in the present invention, it is sufficient to add Sn to the brazing filler metal on the side of the intermediate layer. Otherwise, Sn may be added to the brazing filler metals on both sides of the core material according to circumstances in manufacturing.

Other characteristics of the fourth embodiment of the present invention are similar to those of the first to third embodiments of the present invention.

BRIEF DESCRIPTION OF THE DRAWINGS

The foregoing and other objects and features of the invention will become apparent from the following description of preferred examples of the invention with reference to the accompanying drawings, in which.

DESCRIPTION OF THE PREFERRED EMBODIMENTS

EXAMPLE 1

① Alloy Compositions of Core Material and Intermediate Layer Material

Various core materials and various intermediate layer materials respectively having the different alloy compositions shown in table 1 were prepared. These core materials and intermediate layer materials were combined together as shown in Table 1. One surface of each core material was clad with the intermediate layer material, and both surfaces of this clad material were clad with a brazing filler metal consisting of JIS 4104 alloy (to a thickness of 15% per side relative to the total thickness). In this case, the thickness of the intermediate layer was 15% of the total thickness.

The clad materials formed in this manner were soaked hot-rolled, intermediate-annealed, and cold-rolled into brazing sheets of 1.0 mm in thickness according to a normal method. Table 1 shows the constitution of these brazing sheets.

The brazing sheets (Nos. 1 to 16) thus formed as shown in Table 1 were cleaned, finally annealed, and thereafter manufactured into samples by heating for vacuum brazing at 873K for 3 minutes in a vacuum of $6.7 \times 10^{-3}$ Pa.

Figure 1:
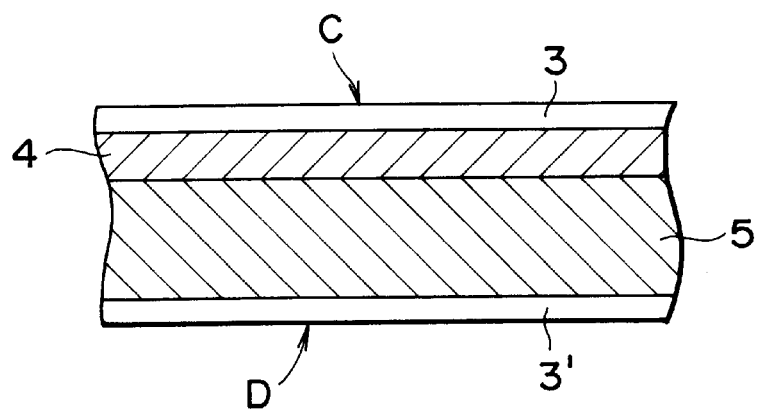
FIG. 1 is a view showing the sectional structure of an Al alloy brazing sheet according to the present invention.
Figure 2:
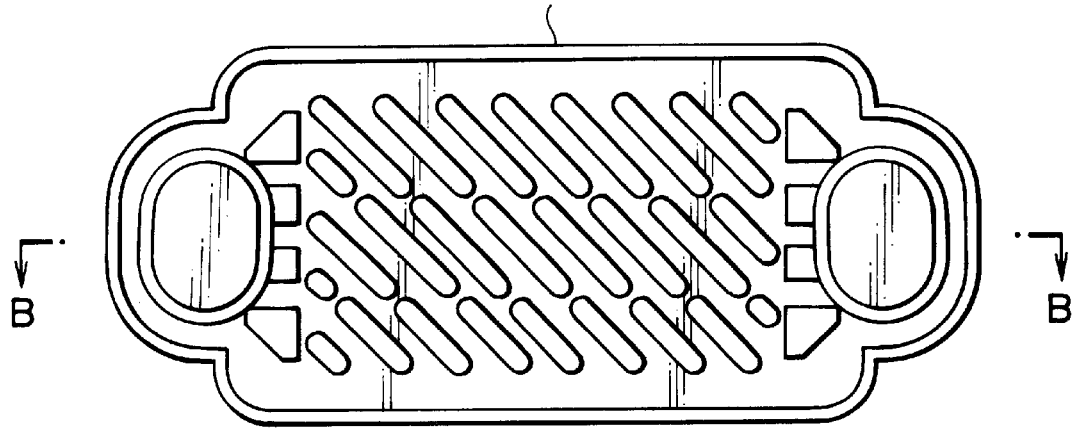
FIG. 2 is a plan view showing a refrigerant passage forming member for an evaporator of drawn-cup type in the prior art.
Figure 3:
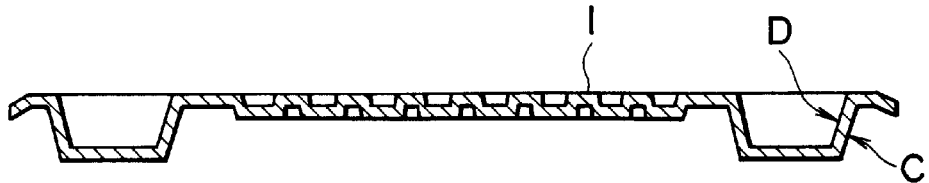
FIG. 3 is a sectional view taken along line B—B' in FIG. 2.
Figure 4:
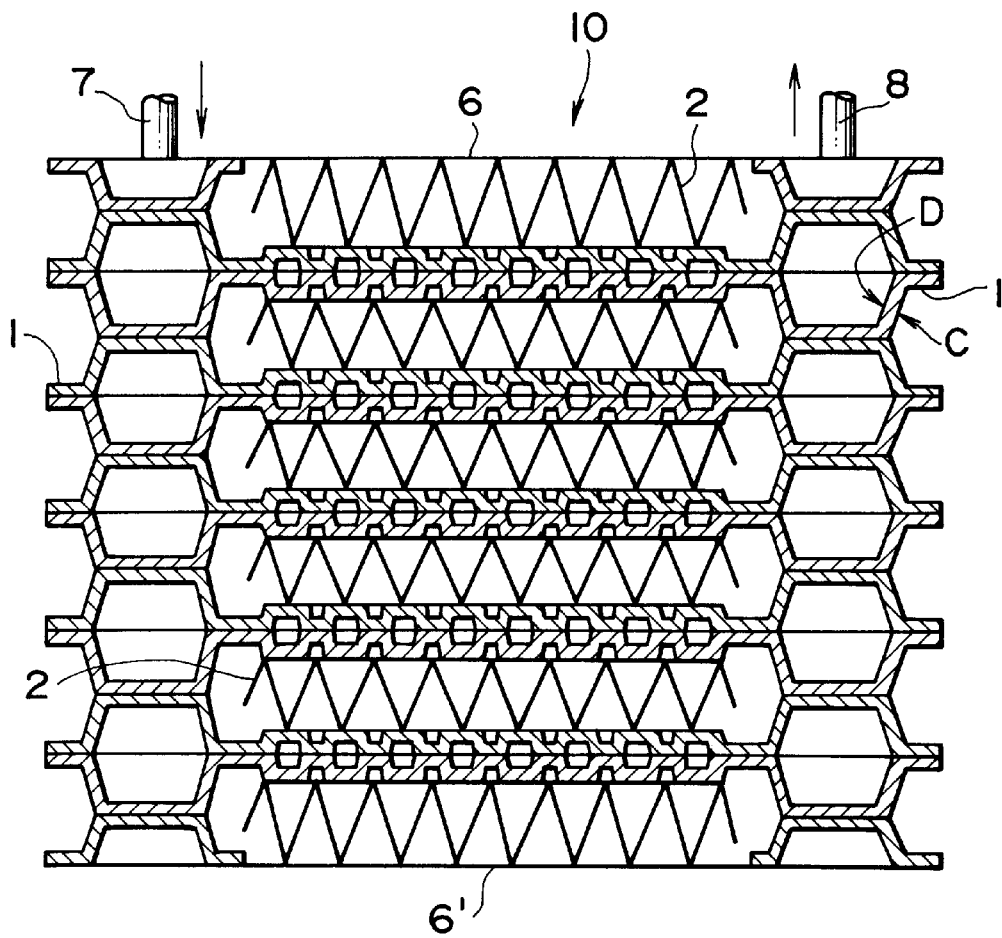
FIG. 4 is a schematic sectional view showing a heat exchanger (i.e., an evaporator of drawn-cup type) of the prior art.

A corrosion test (CASS test) was conducted with one surface (i.e., the side denoted by D in FIG. 1) of each sample coated with resin, and the other surface (i.e., the side denoted by C in FIG. 1) on the side of the intermediate layer remained exposed. These samples were taken out after a lapse of 500 hours and a lapse of 1000 hours from start of the test. Then, after a corrosion product was removed from the surface of each sample, the conditions of corrosion of the materials were evaluated. The evaluation was performed by measuring the maximum depth of pit corrosion with an optical microscope according to focal depth measurement. As for some materials, the types of corrosion were examined as observed in a section. Table 1 also shows the results of measurement.

TABLE 1

| | | Brazing sheet | | | | | | | | | | | | | |
|---|---|---|---|---|---|---|---|---|---|---|---|---|---|---|---|
| | | Core material alloy component (mass %) | | | | | | | Intermediate layer material (with which one surface of core material is clad) Alloy component (mass %) | | | | | | |
| | No. | Si | Fe | Cu | Mn | Mg | Ti | Al | Si | Fe | Cu | Mn | Mg | Ti | Al |
| Example of the present invention | 1 | 0.1 | 0.2 | 0.0 | 1.0 | 0.1 | 0.15 | Remainder | 0.1 | 0.2 | — | 1.0 | 0.08 | 0.15 | Remainder |
| | 2 | 0.1 | 0.2 | 0.1 | 1.0 | 0.1 | — | Remainder | 0.1 | 0.2 | — | 1.2 | 0.1 | 0.15 | Remainder |
| | 3 | 0.1 | 0.2 | 0.5 | 1.0 | 0.1 | — | Remainder | 0.1 | 0.2 | — | 1.0 | 0.1 | — | Remainder |
| | 4 | 0.1 | 0.2 | 0.3 | 1.0 | 0.2 | 0.15 | Remainder | 0.1 | 0.2 | — | 1.0 | 0.2 | 0.15 | Remainder |
| | 5 | 0.1 | 0.2 | 0.3 | 1.0 | 0.2 | — | Remainder | 0.1 | 0.2 | — | 1.0 | 0.2 | — | Remainder |
| | 6 | 0.2 | 0.0 | 0.15 | 1.0 | 0.2 | 0.15 | Remainder | 0.2 | 0.0 | — | 0.5 | 0.1 | 0.15 | Remainder |
| | 7 | 0.2 | 1.6 | 0.15 | 1.0 | 0.2 | 0.15 | Remainder | 0.2 | 0.0 | — | 0.1 | 0.3 | — | Remainder |
| | 8 | 0.1 | 0.2 | 0.3 | 1.0 | 0.2 | — | Remainder | 0.1 | 0.2 | — | 0.0 | 0.1 | — | Remainder |
| | 9 | 0.2 | 0.2 | 0.5 | 1.0 | 0.2 | — | Remainder | 0.1 | 0.2 | — | 0.0 | 0.1 | — | Remainder |
| | 10 | 0.2 | 0.0 | 0.15 | 1.0 | 0.2 | 0.15 | Remainder | 0.1 | 0.2 | — | 0.0 | 0.2 | — | Remainder |

TABLE 1-continued

|  |  |  |  |  |  |  |  |  |  |  |  |  |  |  |
|---|---|---|---|---|---|---|---|---|---|---|---|---|---|---|
|  | 11 | 0.1 | 0.2 | 0.3 | 1.0 | 0.2 | — | Remainder | 0.1 | 0.2 | — | 0.0 | 0.3 | — | Remainder |
|  | 12 | 0.1 | 0.2 | 0.5 | 1.0 | 0.2 | — | Remainder | 0.1 | 0.2 | — | 0.0 | 0.2 | — | Remainder |
| Comparative | 13 | 0.1 | 0.2 | 0.5 | 1.0 | 0.1 | — | Remainder | 0.2 | 0.3 | 0.15 | — | — | — | Remainder |
| example | 14 | 0.1 | 0.2 | 0.5 | 1.0 | 0.1 | — | Remainder | 0.1 | 0.2 | — | 1.0 | 0.1 | 0.15 | Remainder |
|  | 15 | 0.1 | 0.2 | 0.5 | 1.0 | 0.1 | — | Remainder | 0.1 | 0.2 | — | 1.0 | 0.1 | 0.1S | Remainder |
|  | 16 | 0.1 | 0.2 | 1.2 | 1.0 | 0.1 | — | Remainder | 0.1 | 0.2 | — | 1.0 | 0.1 | 0.1S | Remainder |

| | | Brazing sheet | | | Corrosion resistance | |
|---|---|---|---|---|---|---|
| | | Intermediate layer material (with which one surface of core material is clad) | | | Maximum depth of pit corrosion ($\mu$m) | |
| | No. | Clad thickness % | Clad thickness ($\mu$m) | Brazing alloy No. | After lapse of 500 hrs from start of test | After lapse of 1000 hrs from start of test |
| Example of the present invention | 1 | 15 | 150 | 4104 | 250 | 300 |
| | 2 | 15 | 150 | 4104 | 240 | 280 |
| | 3 | 15 | 150 | 4104 | 220 | 270 |
| | 4 | 15 | 150 | 4104 | 350 | 390 |
| | 5 | 15 | 150 | 4104 | 330 | 350 |
| | 6 | 15 | 150 | 4104 | 390 | 420 |
| | 7 | 15 | 150 | 4104 | 370 | 400 |
| | 8 | 15 | 150 | 4104 | 320 | 370 |
| | 9 | 15 | 150 | 4104 | 230 | 290 |
| | 10 | 15 | 150 | 4104 | 270 | 390 |
| | 11 | 15 | 150 | 4104 | 300 | 370 |
| | 12 | 15 | 150 | 4104 | 290 | 350 |
| Comparative example | 13 | 15 | 150 | 4104 | 620 | Penetration |
| | 14 | 15 | 150 | 4104 | 610 | Penetration |
| | 15 | 15 | 150 | 4104 | 690 | Penetration |
| | 16 | 15 | 150 | 4104 | Penetration | Penetration |

Note:
In Tables 1 to 6,
1) Si and Fe are contained as impurities in core material and — in Ti represents Ti content less than 0.01 mass %
2) Si, Fe and Cu are contained as impurities in intermediate layer material, — in Cu and — of Ti respectively represent Cu content less than 0.02 mass % and Ti content less than 0.01 mass %, and
3) Both surfaces of sheet are clad with brazing alloy (at clad rate of 15% per side to total thickness).

As is apparent from Table 1, the brazing sheets (Nos. 1 to 12) according to the present invention are superior in corrosion resistance to the brazing sheets of comparative examples (Nos. 13 to 16).

② Thickness of the Intermediate Layer

The core material of No. 3 in Table 1 was clad with the intermediate layer material of No. 3 in Table 1 with the cladding thickness of the intermediate layer material varied in the range of 2 to 40%, and both surfaces of the clad material were further clad with a brazing filler metal consisting of JIS 4104 alloy (15% per side relative to the total thickness).

The clad materials formed in this manner were soaked, hot-rolled, intermediate-annealed and cold rolled into brazing sheets of 1.0 mm in thickness and 0.5 mm in thickness, respectively, according to a normal method. Table 2 shows the constitution of these brazing sheets.

The brazing sheets (Nos. 3, 17 to 34) shown in Table 2 were cleaned, finally annealed, and thereafter manufactured into samples by heating for brazing at 873K for 3 minutes in a vacuum of $6.7 \times 10^{-3}$Pa.

These samples were further manufactured into test pieces according to JIS No. 5, and the tensile strength of each test piece was measured.

Further, these samples were press-formed. An evaluation was made as to whether or not a press-formed sample had a sufficient height by measuring the stretched height of the press-formed sample.

Further, a corrosion test (CASS test) was conducted with one surface of each sample coated with resin similarly to the above case. These samples were taken out after a lapse of 500 hours and a lapse of 1000 hours from start of the test. Then, after a corrosion product was removed from the surface of each sample, the conditions of corrosion of the material were evaluated. The evaluation was performed by measuring the maximum depth of pit corrosion with an optical microscope according to focal depth measurement. Table 2 also shows the results of measurement.

TABLE 2

| | | Brazing sheet | | | | | | | | | | | | | | |
|---|---|---|---|---|---|---|---|---|---|---|---|---|---|---|---|---|
| | | Core material alloy component (mass %) | | | | | | | Intermediate layer material (with which one surface of core material is clad) | | | | | | | |
| | | | | | | | | | Alloy component (mass %) | | | | | | | Clad thick-ness % | Clad thickness (μm) |
| | No. | Si | Fe | Cu | Mn | Mg | Ti | Al | Si | Fe | Cu | Mn | Mg | Ti | Al | | |
| Example of the present invention | 3 | 0.1 | 0.2 | 0.5 | 1.0 | 0.1 | — | Remainder | 0.1 | 0.2 | — | 1.0 | 0.1 | — | Remainder | 15 | 150 |
| | 17 | 0.1 | 0.2 | 0.5 | 1.0 | 0.1 | — | Remainder | 0.1 | 0.2 | — | 1.0 | 0.1 | — | Remainder | 10 | 100 |
| | 18 | 0.1 | 0.2 | 0.5 | 1.0 | 0.1 | — | Remainder | 0.1 | 0.2 | — | 1.0 | 0.1 | — | Remainder | 8 | 80 |
| | 19 | 0.1 | 0.2 | 0.5 | 1.0 | 0.1 | — | Remainder | 0.1 | 0.2 | — | 1.0 | 0.1 | — | Remainder | 7 | 70 |
| | 20 | 0.1 | 0.2 | 0.5 | 1.0 | 0.1 | — | Remainder | 0.1 | 0.2 | — | 1.0 | 0.1 | — | Remainder | 5 | 50 |
| | 21 | 0.1 | 0.2 | 0.5 | 1.0 | 0.1 | — | Remainder | 0.1 | 0.2 | — | 1.0 | 0.1 | — | Remainder | 25 | 250 |
| | 22 | 0.1 | 0.2 | 0.5 | 1.0 | 0.1 | — | Remainder | 0.1 | 0.2 | — | 1.0 | 0.1 | — | Remainder | 30 | 300 |
| | 23 | 0.1 | 0.2 | 0.5 | 1.0 | 0.1 | — | Remainder | 0.1 | 0.2 | — | 1.0 | 0.1 | — | Remainder | 35 | 350 |
| | 24 | 0.1 | 0.2 | 0.5 | 1.0 | 0.1 | — | Remainder | 0.1 | 0.2 | — | 1.0 | 0.1 | — | Remainder | 6 | 30 |
| | 25 | 0.1 | 0.2 | 0.5 | 1.0 | 0.1 | — | Remainder | 0.1 | 0.2 | — | 1.0 | 0.1 | — | Remainder | 15 | 75 |
| | 26 | 0.1 | 0.2 | 0.5 | 1.0 | 0.1 | — | Remainder | 0.1 | 0.2 | — | 1.0 | 0.1 | — | Remainder | 20 | 100 |
| | 27 | 0.1 | 0.2 | 0.5 | 1.0 | 0.1 | — | Remainder | 0.1 | 0.2 | — | 1.0 | 0.1 | — | Remainder | 25 | 125 |
| | 28 | 0.1 | 0.2 | 0.5 | 1.0 | 0.1 | — | Remainder | 0.1 | 0.2 | — | 1.0 | 0.1 | — | Remainder | 30 | 150 |
| | 29 | 0.1 | 0.2 | 0.5 | 1.0 | 0.1 | — | Remainder | 0.1 | 0.2 | — | 1.0 | 0.1 | — | Remainder | 35 | 175 |
| Comparative example | 30 | 0.1 | 0.2 | 0.5 | 1.0 | 0.1 | — | Remainder | 0.1 | 0.2 | — | 1.0 | 0.1 | — | Remainder | 2 | 20 |
| | 31 | 0.1 | 0.2 | 0.5 | 1.0 | 0.1 | — | Remainder | 0.1 | 0.2 | — | 1.0 | 0.1 | — | Remainder | 40 | 400 |
| | 32 | 0.1 | 0.2 | 0.5 | 1.0 | 0.1 | — | Remainder | 0.1 | 0.2 | — | 1.0 | 0.1 | — | Remainder | 2 | 10 |
| | 33 | 0.1 | 0.2 | 0.5 | 1.0 | 0.1 | — | Remainder | 0.1 | 0.2 | — | 1.0 | 0.1 | — | Remainder | 5 | 25 |
| | 34 | 0.1 | 0.2 | 0.5 | 1.0 | 0.1 | — | Remainder | 0.1 | 0.2 | — | 1.0 | 0.1 | — | Remainder | 40 | 200 |

| | | Brazing sheet | | Corrosion resistance Maximum depth of pit corrosion (μm) | | Reference Tensile strength after heathing (MPa) | Reference height after press-forming (mm) |
|---|---|---|---|---|---|---|---|
| | No. | Brazing alloy No. | Total thickness (mm) | of 500 hrs from start of test | of 1000 hrs from start of test | | |
| Example of the present invention | 3 | 4104 | 1.0 | 230 | 290 | 140 | 8.10 |
| | 17 | 4104 | 1.0 | 210 | 300 | 143 | 8.05 |
| | 18 | 4104 | 1.0 | 210 | 290 | 144 | 7.91 |
| | 19 | 4104 | 1.0 | 220 | 410 | 144 | 7.02 |
| | 20 | 4104 | 1.0 | 240 | 450 | 145 | 7.01 |
| | 21 | 4104 | 1.0 | 250 | 280 | 135 | 6.16 |
| | 22 | 4104 | 1.0 | 260 | 270 | 133 | 6.18 |
| | 23 | 4104 | 1.0 | 270 | 270 | 131 | 6.19 |
| | 24 | 4104 | 0.5 | 180 | 410 | 145 | 6.94 |
| | 25 | 4104 | 0.5 | 200 | 370 | 143 | 7.11 |
| | 26 | 4104 | 0.5 | 210 | 270 | 139 | 8.06 |
| | 27 | 4104 | 0.5 | 210 | 280 | 136 | 8.08 |
| | 28 | 4104 | 0.5 | 220 | 250 | 134 | 8.09 |
| | 29 | 4104 | 0.5 | 240 | 270 | 132 | 8.11 |
| Comparative example | 30 | 4104 | 1.0 | 580 | Penetration | 147 | 5.99 |
| | 31 | 4104 | 1.0 | 370 | 600 | 126 | 8.23 |
| | 32 | 4104 | 0.5 | Penetration | Penetration | 150 | 5.91 |
| | 33 | 4104 | 0.5 | Penetration | Penetration | 149 | 6.00 |
| | 34 | 4104 | 0.5 | Penetration | Peoetration | 131 | 8.14 |

As is apparent from Table 2, the brazing sheets (Nos. 3, 17 to 29) according to the present invention are by no means inferior in strength to brazing sheets of comparative examples (Nos. 30 to 34), and are excellent in formability, particularly in corrosion resistance.

③ Sn Added to Al—Si—Mg Alloy Brazing Filler Metal

The various core materials and various intermediate layer materials shown in Table 3 were combined together, and these core materials were respectively clad with the intermediate layer materials. Further, both surfaces of each clad material were further clad with a brazing filler metal prepared by further adding 0.05 to 0.6% of Sn to JIS 4104 alloy (with a cladding thickness of 15% per side relative to the total thickness).

The clad materials formed in this manner were soaked, hot-rolled, intermediate-annealed and cold-rolled into brazing sheets of 1.0 mm in thickness according to a normal method. Table 3 shows the constitution of these brazing sheets.

These brazing sheets (Nos. 35 to 42) shown in Table 3 were cleaned, finally annealed, and thereafter manufactured into samples by heating for vacuum brazing at 873K for 3 minutes in a vacuum of $6.7 \times 10^{-3}$ Pa.

A corrosion test (CASS test) was conducted with one surface of each sample coated with resin, similarly to the above case. These samples were taken out after a lapse of 500 hours and a lapse of 1000 hours from start of the test. Then, a corrosion product was removed from the surface of each sample, and the conditions of corrosion of the material were evaluated. The evaluation was performed by measuring the maximum depth of pit corrosion with an optical microscope according to focal depth measurement. Table 3 also shows the results of measurement.

TABLE 3

| | No. | Core material alloy component (mass %) | | | | | | | Intermediate layer material (with which one surface of core material is clad) Alloy component (mass %) | | | | | | |
|---|---|---|---|---|---|---|---|---|---|---|---|---|---|---|---|
| | | Si | Fe | Cu | Mn | Mg | Ti | Al | Si | Fe | Cu | Mn | Mg | Ti | Al |
| Example of the present invention | 35 | 0.1 | 0.2 | 0.5 | 1.0 | 0.1 | — | Remainder | 0.1 | 0.2 | — | 1.0 | 0.1 | — | Remainder |
| | 36 | 0.1 | 0.2 | 0.5 | 1.0 | 0.1 | — | Remainder | 0.1 | 0.2 | — | 1.0 | 0.1 | — | Remainder |
| | 37 | 0.1 | 0.2 | 0.3 | 1.0 | 0.2 | — | Remainder | 0.1 | 0.2 | — | 1.0 | 0.2 | — | Remainder |
| | 38 | 0.1 | 0.2 | 0.3 | 1.0 | 0.2 | — | Remainder | 0.1 | 0.2 | — | 1.0 | 0.2 | — | Remainder |
| | 39 | 0.1 | 0.6 | 0.15 | 1.0 | 0.2 | 1.15 | Remainder | 0.2 | 0.6 | — | 1.0 | 0.2 | — | Remainder |
| Comparative example | 40 | 0.1 | 0.2 | 0.5 | 1.0 | 0.1 | — | Remainder | 0.1 | 0.2 | — | 1.0 | 0.1 | — | Remainder |
| | 41 | 0.1 | 0.2 | 0.3 | 1.0 | 0.2 | — | Remainder | 0.1 | 0.2 | — | 1.0 | 0.2 | — | Remainder |
| | 42 | 0.1 | 0.6 | 0.15 | 1.0 | 0.2 | 1.15 | Remainder | 0.2 | 0.6 | — | 1.0 | 0.2 | — | Remainder |

| | | Brazing sheet | | | | | | | Corrosion resistance Maximum depth of pit corrosion ($\mu$s) | |
|---|---|---|---|---|---|---|---|---|---|---|
| | | Intermediate layer material (with which one surface of core material is clad) | | | | | | | After lapse of 500 hrs from start of test | After lapse of 1000 hrs from start of test |
| | No. | Clad thickness % | Clad thickness ($\mu$m) | Brazing alloy Alloy component (mass %) | | | | | |
| | | | | Si | Mg | Si | Sn | Al | | |
| Example of the present invention | 35 | 15 | 150 | 10.0 | 1.5 | 0.1 | 0.2 | Remainder | 100 | 210 |
| | 36 | 15 | 150 | 10.0 | 1.5 | 0.1 | 0.5 | Remainder | 190 | 220 |
| | 37 | 15 | 150 | 10.0 | 1.5 | 0.1 | 0.05 | Remainder | 110 | 240 |
| | 38 | 15 | 150 | 10.0 | 1.5 | 0.1 | 0.3 | Remainder | 180 | 230 |
| | 39 | 15 | 150 | 10.0 | 1.5 | 0.1 | 0.1 | Remainder | 100 | 220 |
| Comparative example | 40 | 15 | 150 | 10.0 | 1.5 | 0.1 | 0.6 | Remainder | 410 | 750 |
| | 41 | 15 | 150 | 10.0 | 1.5 | 0.1 | 0.6 | Remainder | 520 | 800 |
| | 42 | 15 | 150 | 10.0 | 1.5 | 0.1 | 0.6 | Remainder | 560 | 780 |

As is apparent from Table 3, the brazing sheets (Nos. 35 to 39) according to the present invention have corrosion resistance superior to that of the brazing sheets of the comparative examples (Nos. 40 to 42).

EXAMPLE 2

① Alloy Compositions of Core Material and Intermediate Layer Material

Various core materials and various intermediate layer materials respectively having different alloy compositions shown in Table 4 were prepared. These core materials and intermediate layer materials were combined together as shown in Table 4, one surface of each core material was clad with the intermediate layer material, and both surfaces of the clad material were clad with a brazing filler metal consisting of JIS 4104 alloy (to a thickness of 15% per side relative to the total thickness). In this case, the thickness of the intermediate layer was set to be 15% of the total thickness.

These clad materials formed in this manner were soaked, hot-rolled, intermediate-annealed and cold-rolled into brazing sheets of 1.0 mm in thickness according to a normal method. Table 4 shows the constitution of these brazing sheets.

These brazing sheets (Nos. 1 to 13) thus formed as shown in Table 4 were cleaned, finally annealed, and thereafter manufactured into samples by heating for vacuum brazing at 873K for 3 minutes in a vacuum of $6.7 \times 10^{-3}$Pa.

A corrosion test (CASS test) was conducted with one surface (i.e., the side denoted by D in FIG. 1) of each sample coated with resin, and the other surface (i.e., the side denoted by C in FIG. 1) on the side of the intermediate layer remained exposed. These samples were taken out after a lapse of 500 hours and a lapse of 1000 hours subsequent to the start of the test. Then, after a corrosion product was removed from the surface of each sample, the conditions of corrosion of the material were evaluated. The evaluation was performed by measuring the maximum depth of pit corrosion with an optical microscope according to focal depth measurement. For some materials, the types of corrosion were examined as observed in section. Table 4 also shows the results of measurement.

TABLE 4

| | | Core material alloy component (mass %) | | | | | | | Intermediate layer material (with which one surface of core material is clad) Alloy component (mass %) | | | | | | | | |
|---|---|---|---|---|---|---|---|---|---|---|---|---|---|---|---|---|---|
| | No. | Si | Fe | Cu | Mn | Mg | Ti | Al | Si | Fe | Cu | Mn | Mg | Ti | Zn | Sn | Al |
| Example of the present invention | 1 | 0.1 | 0.2 | 0.5 | 1.0 | 0.1 | — | Remainder | 0.1 | 0.2 | — | 1.0 | 0.1 | 0.15 | — | 0.1 | Remainder |
| | 2 | 0.1 | 0.2 | 0.5 | 1.0 | 0.1 | — | Remainder | 0.1 | 0.2 | — | 1.0 | 0.1 | — | — | 0.15 | Remainder |
| | 3 | 0.1 | 0.2 | 0.5 | 1.0 | 0.1 | — | Remainder | 0.1 | 0.2 | — | 1.0 | 0.1 | — | 4.0 | — | Remainder |
| | 4 | 0 1 | 0.2 | 0.5 | 1.0 | 0.1 | — | Remainder | 0.1 | 0.2 | — | 1.0 | 0.1 | — | 4.0 | 0.15 | Remainder |
| | 5 | 0.1 | 0.2 | 0.3 | 1.0 | 0.2 | 1.15 | Remainder | 0.1 | 0.2 | — | 1.0 | 0.2 | 0.15 | — | 0.1 | Remainder |
| | 6 | 0.1 | 0.2 | 0.3 | 1.0 | 0.2 | 0.15 | Remainder | 0.1 | 0.2 | — | 1.0 | 0.2 | 0.15 | 4.0 | — | Remainder |
| | 7 | 0.2 | 0.6 | 0.15 | 1.0 | 0.2 | 1.15 | Remainder | 0.2 | 0.6 | — | 1.0 | 0.2 | 0.15 | — | 0.1 | Remainder |
| | 8 | 0.2 | 0.2 | 0.15 | 1.0 | 0.2 | 0.15 | Remainder | 0.2 | 0.6 | — | 1.0 | 0.2 | — | — | 0.1 | Remainder |
| Comparative invention | 9 | 0.1 | 0.2 | 0.5 | 1.0 | 0.1 | — | Remainder | 0.2 | 0.3 | 0.15 | — | — | — | — | — | Remainder |
| | 10 | 0.1 | 0.2 | 1.2 | 1.0 | 0.1 | — | Remainder | 0.1 | 0.2 | — | 1.0 | 0.1 | 0.15 | — | — | Remainder |
| | 11 | 0.1 | 0.2 | 0.5 | 1.0 | 0.1 | 0.08 | Remainder | 0.1 | 0.2 | — | 1.0 | 0.1 | 0.15 | — | 0.6 | Remainder |
| | 12 | 0.1 | 0.2 | 0.5 | 1.0 | 0.2 | — | Remainder | 0.1 | 0.2 | — | 0.8 | 0.1 | — | — | 0.6 | Remainder |
| | 13 | 0.1 | 0.2 | 0.5 | 1.0 | 0.1 | 0.08 | Remainder | 0.1 | 0.2 | — | 1.0 | 0.1 | 0.15 | 12.1 | — | Remainder |

| | | Brazing sheet Intermediate layer material (with which one surface core material is clad) | | | Corrosion resistance Maximum depth of pit corrosion (μs) | |
|---|---|---|---|---|---|---|
| | No. | Clad thickness % | Clad thickness (μs) | Brazing Alloy No. | After lapse of 500 hrs from start of test | After lapse of 1000 hrs from start of test |
| Example of the present invention | 1 | 15 | 150 | 4104 | 150 | 180 |
| | 2 | 15 | 150 | 4104 | 140 | 180 |
| | 3 | 15 | 150 | 4104 | 150 | 210 |
| | 4 | 15 | 150 | 4104 | 120 | 200 |
| | 5 | 15 | 150 | 4104 | 180 | 210 |
| | 6 | 15 | 150 | 4104 | 170 | 240 |
| | 7 | 15 | 150 | 4104 | 190 | 250 |
| | 8 | 15 | 150 | 4104 | 150 | 230 |
| Comparative invention | 9 | 15 | 150 | 4104 | 620 | Penetration |
| | 10 | 15 | 150 | 4104 | Penetration | Penetration |
| | 11 | 15 | 150 | 4104 | 490 | Penetration |
| | 12 | 15 | 150 | 4104 | 410 | Penetration |
| | 13 | 15 | 150 | 4104 | 580 | Penetration |

As is apparent from Table 4, the brazing sheets (Nos. 1 to 8) according to the present invention are more excellent in corrosion resistance than the brazing sheets of the comparative examples (Nos. 9 to 13).

② Thickness of Intermediate Layer

The core material of No. 2 in Table 4 was clad with the intermediate layer material of No. 2 in Table 2 with the thickness of the intermediate layer material varied in the range of 2 to 40% of the total thickness, and both surfaces of the clad material ware clad with a brazing filler metal consisting of JIS 4104 alloy (to a thickness of 15% per side relative to the total thickness).

The clad materials formed in this manner were soaked, hot-rolled, intermediate-annealed and cold-rolled into brazing sheets of 1.0 mm in thickness and those of 0.5 mm in thickness according to a normal method. Table 5 shows the constitution of these brazing sheets.

The brazing sheets (Nos. 14 to 31) shown in Table 5 were cleaned, finally annealed and thereafter manufactured into samples by heating for vacuum brazing at 873K for 3 minutes in a vacuum of $6.7 \times 10^{-3}$Pa.

These samples were manufactured into test pieces according to JIS No. 5, and the tensile strength thereof was measured.

These samples were also press-formed. An evaluation was made as to whether or not a press-formed sample has a sufficient height by measuring the stretched height of the press-formed sample.

Further, a corrosion test (CASS test) was conducted with one surface of each sample coated with resin similarly to the above case. The samples were taken out after a lapse of 500 hours and a lapse of 1000 hours subsequent to the start of the test. Then, after a corrosion product was removed from the surface of each sample, the conditions of corrosion of the material were evaluated. The evaluation was performed by measuring the maximum depth of pit corrosion with an optical microscope according to focal depth measurement. Table 5 also shows the results of measurement.

TABLE 5

| | | | Core material alloy component (mass %) | | | | | | | Intermediate layer material (with which one surface of core material is clad) | | | | | | | | | |
|---|---|---|---|---|---|---|---|---|---|---|---|---|---|---|---|---|---|---|---|
| | | | | | | | | | | Alloy component (mass %) | | | | | | | | Clad thick-ness % | Clad thickness ($\mu$m) |
| | No. | Si | Fe | Cu | Mn | Mg | Ti | Al | Si | Fe | Cu | Mn | Mg | Ti | Zn | Sn | Al | | |
| Example of the present invention | 14 | 0.1 | 0.2 | 0.5 | 1.0 | 0.1 | — | Remainder | 0.1 | 0.2 | — | 1.0 | 0.1 | — | — | 0.15 | Remainder | 10 | 100 |
| | 15 | 0.1 | 0.2 | 0.5 | 1.0 | 0.1 | — | Remainder | 0.1 | 0.2 | — | 1.0 | 0.1 | — | — | 0.15 | Remainder | 8 | 80 |
| | 16 | 0.1 | 0.2 | 0.5 | 1.0 | 0.1 | — | Remainder | 0.1 | 0.2 | — | 1.0 | 0.1 | — | — | 0.15 | Remainder | 7 | 70 |
| | 17 | 0.1 | 0.2 | 0.5 | 1.0 | 0.1 | — | Remainder | 0.1 | 0.2 | — | 1.0 | 0.1 | — | — | 0.15 | Remainder | 5 | 50 |
| | 18 | 0.1 | 0.2 | 0.5 | 1.0 | 0.1 | — | Remainder | 0.1 | 0.2 | — | 1.0 | 0.1 | — | — | 0.15 | Remainder | 25 | 250 |
| | 19 | 0.1 | 0.2 | 0.5 | 1.0 | 0.1 | — | Remainder | 0.1 | 0.2 | — | 1.0 | 0.1 | — | — | 0.15 | Remainder | 30 | 300 |
| | 20 | 0.1 | 0.2 | 0.5 | 1.0 | 0.1 | — | Remainder | 0.1 | 0.2 | — | 1.0 | 0.1 | — | — | 0.15 | Remainder | 35 | 350 |
| | 21 | 0.1 | 0.2 | 0.5 | 1.0 | 0.1 | — | Remainder | 0.1 | 0.2 | — | 1.0 | 0.1 | — | — | 0.15 | Remainder | 6 | 30 |
| | 22 | 0.1 | 0.2 | 0.5 | 1.0 | 0.1 | — | Remainder | 0.1 | 0.2 | — | 1.0 | 0.1 | — | — | 0.15 | Remainder | 15 | 75 |
| | 23 | 0.1 | 0.2 | 0.5 | 1.0 | 0.1 | — | Remainder | 0.1 | 0.2 | — | 1.0 | 0.1 | — | — | 0.15 | Remainder | 20 | 100 |
| | 24 | 0.1 | 0.2 | 0.5 | 1.0 | 0.1 | — | Remainder | 0.1 | 0.2 | — | 1.0 | 0.1 | — | — | 0.15 | Remainder | 25 | 125 |
| | 25 | 0.1 | 0.2 | 0.5 | 1.0 | 0.1 | — | Remainder | 0.1 | 0.2 | — | 1.0 | 0.1 | — | — | 0.15 | Remainder | 30 | 150 |
| | 26 | 0.1 | 0.2 | 0.5 | 1.0 | 0.1 | — | Remainder | 0.1 | 0.2 | — | 1.0 | 0.1 | — | — | 0.15 | Remainder | 35 | 175 |
| Comparative example | 27 | 0.1 | 0.2 | 0.5 | 1.0 | 0.1 | — | Remainder | 0.1 | 0.2 | — | 1.0 | 0.1 | — | — | 0.15 | Remainder | 2 | 20 |
| | 28 | 0.1 | 0.2 | 0.5 | 1.0 | 0.1 | — | Remainder | 0.1 | 0.2 | — | 1.0 | 0.1 | — | — | 0.15 | Remainder | 40 | 400 |
| | 29 | 0.1 | 0.2 | 0.5 | 1.0 | 0.1 | — | Remainder | 0.1 | 0.2 | — | 1.0 | 0.1 | — | — | 0.15 | Remainder | 2 | 10 |
| | 30 | 0.1 | 0.2 | 0.5 | 1.0 | 0.1 | — | Remainder | 0.1 | 0.2 | — | 1.0 | 0.1 | — | — | 0.15 | Remainder | 5 | 25 |
| | 31 | 0.1 | 0.2 | 0.5 | 1.0 | 0.1 | — | Remainder | 0.1 | 0.2 | — | 1.0 | 0.1 | — | — | 0.15 | Remainder | 40 | 200 |

| | | | | Corrosion resistance Maximum depth of pit corrosion ($\mu$m) | | Reference: Tensile | Reference: height |
|---|---|---|---|---|---|---|---|
| | | | Brazing sheet | After lapse | After | strength | after |
| | | No. | Brazing alloy No. | Total thickness (mm) | of 500 hrs from start of test | 1000 hrs from start of test | after heating (MPa) | press-forming (mm) |
| Example of the present invention | 14 | 4104 | 1.0 | 90 | 120 | 142 | 7.89 |
| | 15 | 4104 | 1.0 | 80 | 100 | 141 | 7.95 |
| | 16 | 4104 | 1.0 | 65 | 90 | 141 | 7.95 |
| | 17 | 4104 | 1.0 | 70 | 95 | 138 | 8.16 |
| | 18 | 4104 | 1.0 | 230 | 260 | 144 | 7.65 |
| | 19 | 4104 | 1.0 | 300 | 350 | 145 | 7.59 |
| | 20 | 4104 | 1.0 | 340 | 380 | 146 | 7.60 |
| | 21 | 4104 | 0.5 | 100 | 200 | 140 | 7.93 |
| | 22 | 4104 | 0.5 | 80 | 100 | 143 | 7.70 |
| | 23 | 4104 | 0.5 | 100 | 130 | 144 | 7.61 |
| | 24 | 4104 | 0.5 | 120 | 135 | 144 | 7.90 |
| | 25 | 4104 | 0.5 | 145 | 160 | 145 | 7.55 |
| | 26 | 4104 | 0.5 | 160 | 190 | 146 | 7.60 |
| Comparative example | 27 | 4104 | 1.0 | 350 | Penetration | 132 | 8.23 |
| | 28 | 4104 | 1.0 | 380 | 500 | 152 | 5.67 |
| | 29 | 4104 | 0.5 | 180 | Penetration | 131 | 830 |
| | 30 | 4104 | 0.5 | Penetration | Penetration | 135 | 8.11 |
| | 31 | 4104 | 0.5 | 200 | 300 | 153 | 5.60 |

As is apparent from Table 5, the brazing sheets (Nos. 14 to 26) according to the present invention are by no means inferior in strength to the brazing sheets of the comparative examples (Nos. 27 to 31), and are excellent in formability, particularly in corrosion resistance.

(3) Sn Added to Al—Si—Mg Alloy Brazing Filler Metal

Various core materials and various intermediate layer materials shown in Table 6 were combined together, and these core materials were respectively clad with these intermediate layer materials. Further, both surfaces of each clad material were clad with a brazing filler metal prepared by adding 0.2 to 1.2% of Sn to JIS 4104 alloy (to a thickness of 15% per side relative to the total thickness).

The clad materials formed in this manner were soaked, hot-rolled, intermediate-annealed and cold-rolled into brazing sheets of 1.0 mm in thickness according to a normal method. Table 6 shows the constitution of these brazing sheets.

The brazing sheets (Nos. 32 to 39) shown in Table 6 were cleaned, finally annealed and thereafter manufactured into samples by heating for vacuum brazing at 873K for 3 minutes in a vacuum of 6.7×10$^{-3}$Pa.

A corrosion test (CASS) test was conducted with one surface of each sample coated with resin similarly to the above case. The samples were taken out after a lapse of 500 hours and a lapse of 1000 hours subsequent to the start of the test. Then, after a corrosion product was removed from the surface of each sample, the conditions of corrosion of the material were evaluated. The evaluation was performed by measuring the maximum depth of pit corrosion with an optical microscope according to focal depth measurement. Table 6 also shows the results of measurement.

TABLE 6

| | No. | Brazing sheet | | | | | | | | | | | | | | |
|---|---|---|---|---|---|---|---|---|---|---|---|---|---|---|---|---|
| | | Core material alloy component (mass %) | | | | | | Intermediate layer material (with which one surface of core material is clad) Alloy component (mass %) | | | | | | | | |
| | | Si | Fe | Cu | Mn | Mg | Ti | Al | Si | Fe | Cu | Mn | Mg | Ti | Zn | Sn | Al |
| Example of the present invention | 32 | 0.1 | 0.2 | 0.5 | 1.0 | 0.1 | — | Remainder | 0.1 | 0.2 | — | 1.0 | 0.1 | 0.15 | — | 0.05 | Remainder |
| | 33 | 0.1 | 0.2 | 0.5 | 1.0 | 0.1 | — | Remainder | 0.1 | 0.2 | — | 1.0 | 0.1 | 0.15 | — | 0.05 | Remainder |
| | 34 | 0.1 | 0.2 | 0.3 | 1.0 | 0.2 | — | Remainder | 0.1 | 0.2 | — | 1.0 | 0.2 | — | — | 0.1 | Remainder |
| | 35 | 0.1 | 0.2 | 0.15 | 1.0 | 0.2 | 0.15 | Remainder | 0.1 | 0.2 | — | 1.0 | 0.2 | — | — | 0.1 | Remainder |
| | 36 | 0.1 | 0.2 | 0.15 | 1.0 | 0.2 | 0.15 | Remainder | 0.1 | 0.2 | — | 1.0 | 0.2 | — | — | 0.1 | Remainder |
| Comparative example | 37 | 0.1 | 0.2 | 0.5 | 1.0 | 0.1 | — | Remainder | 0.1 | 0.2 | — | 1.0 | 0.1 | 0.15 | — | 0.05 | Remainder |
| | 38 | 0.1 | 0.2 | 0.3 | 1.0 | 0.2 | — | Remainder | 0.1 | 0.2 | — | 1.0 | 0.2 | — | — | 0.1 | Remainder |
| | 39 | 0.1 | 0.2 | 0.15 | 1.0 | 0.2 | 0.15 | Remainder | 0.1 | 0.2 | — | 1.0 | 0.2 | — | — | 0.1 | Remainder |

| | | Brazing sheet | | | | | | | Corrosion resistance | |
|---|---|---|---|---|---|---|---|---|---|---|
| | | Intermediate layer material (with which one surface of core material is clad) | | | | | | | Maximum depth of pit corrosion ($\mu$m) | |
| | | | | | | | | | After lapse of 500 hrs from start of test | After lapse of 1000 hrs from start of test |
| | No. | Clad thickness % | Clad thickness ($\mu$m) | Brazing alloy Alloy component (mass %) | | | | | | |
| | | | | Si | Mg | Bi | Sn | Al | | |
| Example of the present invention | 32 | 15 | 150 | 10.0 | 1.5 | 0.1 | 0.2 | Remainder | 120 | 140 |
| | 33 | 15 | 150 | 10.0 | 1.5 | 0.1 | 0.4 | Remainder | 190 | 210 |
| | 34 | 15 | 150 | 10.0 | 1.5 | 0.1 | 0.2 | Remainder | 140 | 160 |
| | 35 | 15 | 150 | 10.0 | 1.5 | 0.1 | 0.2 | Remainder | 100 | 130 |
| | 36 | 15 | 150 | 10.0 | 1.5 | 0.1 | 0.4 | Remainder | 130 | 160 |
| Comparative example | 37 | 15 | 150 | 10.0 | 1.5 | 0.1 | 1.2 | Remainder | 650 | 850 |
| | 38 | 15 | 150 | 10.0 | 1.5 | 0.1 | 1.2 | Remainder | 710 | Penetration |
| | 39 | 15 | 150 | 10.0 | 1.5 | 0.1 | 1.2 | Remainder | 580 | Penetration |

As is apparent from Table 6, the brazing sheets (Nos. 32 to 36) according to the present invention are more excellent in corrosion resistance than the brazing sheets of the comparative examples (Nos. 37 to 39).

The present invention remarkably improves the corrosion resistance of one surface, which one surface must withstand a severe corrosive environment in use, of an Al alloy brazing sheet. Accordingly, in case of forming this brazing sheet into a heat exchanger, it is possible to remarkably improve the life of the outside corrosion resistance of the heat exchanger.

What is claimed is:

1. An Al alloy brazing sheet for use in manufacture, by means of vacuum brazing, of a heat exchanger having a tank portion and a refrigerant passage portion, respectively formed by bonding press-formed brazing sheets together and then vacuum brazing, said Al alloy brazing sheet comprising:

an Al alloy core material presenting first and second surfaces and having a composition consisting of 0.5 to 2.0 mass % hereinafter abbreviated simply as %) of Mn, 0.1 to 1.0% of Cu, 0.05 to 0.5% of Mg and 0.05 to 0.3% of Ti, with the remainder being Al and inevitable impurities;

an intermediate layer presenting opposing surfaces, one of said opposing surfaces being adhered to said first surface of said core material, said intermediate layer consisting of an Al alloy having a composition consisting of 0.5 to 2.0% of Mn, 0.05 to 0.5% of Mg and 0.05 to 0.3% of Ti, with the remainder being Al and inevitable impurities, said intermediate layer having a thickness of 30 $\mu$m or more and constituting 35% or less of the total thickness of the brazing sheet; and first and second layers of Al—Si—Mg alloy brazing filler metal adhered, respectively, directly to the other opposing surface of said intermediate layer to provide an outer surface for the heat exchanger and to said second surface of said core material.

2. An Al alloy brazing sheet for use in manufacture, by means of vacuum brazing, of a heat exchanger having a tank portion and a refrigerant passage portion respectively formed by bonding press-formed brazing sheets together and then vacuum brazing, said Al alloy brazing sheet comprising:

an Al alloy core material presenting first and second surfaces and having a composition consisting of 0.5 to 2.0% of Mn, 0.1 to 1.0% of Cu, 0.05 to 0.5% of Mg and 0.05 to 0.3% of Ti, with the remainder being Al and inevitable impurities;

an intermediate layer presenting opposing surfaces, one of said opposing surfaces being adhered to said first surface of said core material, said intermediate layer consisting of an Al alloy having a composition consisting of 0.5 to 2.0% of Mn, 0.05 to 0.5% of Mg, 0.05 to 0.3% of Ti and one or both of 0.05 to 0.5% of Sn and 0.05 to 10.0% of Zn, with the remainder being Al and inevitable impurities, said intermediate layer having a thickness of 30 $\mu$m or more and constituting 35% or less of the total thickness of the brazing sheet; and first and second layers of Al—Si—Mg alloy brazing filler metal each constituting 5–20% of the total thickness of the Al alloy brazing sheet and adhered, respectively, directly to the other opposing surface of said intermediate layer to provide an outer surface for the heat exchanger and to said second surface of said core material.

3. An Al alloy brazing sheet for use in vacuum brazing according to claim 1, wherein the thickness of said intermediate layer is 80 μm or more and constitutes 35% or less of the total thickness of the Al alloy brazing sheet.

4. An Al alloy brazing sheet for use in vacuum brazing according to claim 1, wherein said Al—Si—Mg alloy brazing filler metal contains 0.05 to 1.0% Sn.

5. An Al alloy brazing sheet for use in vacuum brazing according to claim 2, wherein the thickness of said intermediate layer is 80 μm or more and constitutes 35% or less of the total thickness of the Al alloy brazing sheet.

6. An Al alloy brazing sheet for use in vacuum brazing according to claim 2, wherein said Al—Si—Mg alloy brazing filler metal contains 0.05 to 1.0% Sn.

7. An Al alloy brazing sheet for use in vacuum brazing according to claim 3, wherein said Al—Si—Mg alloy brazing filler metal contains 0.05 to 1.0% Sn.

* * * * *

UNITED STATES PATENT AND TRADEMARK OFFICE
CERTIFICATE OF CORRECTION

PATENT NO. : 6,063,510
DATED : May 16, 2000
INVENTOR(S) : Inabayashi et al.

It is certified that error appears in the above-identified patent and that said Letters Patent is hereby corrected as shown below:

Title page,
Under the heading "Foreign Application Priority Data", "Mar. 5, 1996" should read -- Apr. 5, 1996 --.

Column 1,
Line 55, "so" should read -- of --.

Column 6,
Line 1, "MQ" should read -- Mg --.

Column 7,
Line 30, "05" should read -- 0.5 --.

Columns 7 and 8,
Table 1, line "Example No. 1", under the heading "Core material...", in the vertical coulmn for "Cu", "0.0" should read -- 0.5 --;
"Example No. 2", under the heading "Core material...", in the vertical column "Cu", "0.1" should read -- 0.5 --;
"Example No. 6", under the heading "Core material...", in the vertical column "Fe", "0.0" should read -- 0.6 --; and
Under the heading "Intermediate layer...", in the verical column "Fe", "0.0" should read -- 0.6 -- and in the vertical column "Mg", "0.1" should read -- 0.4 --.
"Example No. 7", under the heading "Core material...", in the vetical column "Fe", "1.6" should read -- 0.6 --; and
Under the heading "Intermediate layer...", in the vertical column "Fe", "0.0" should read -- 0.6 --; in the vertical column ""Mn" 0.1" should read -- 0.7 --;
"Example No.8", under the heading "Intermediate layer...", in the vertical column ""Mn 0.0" should read -- 0.8 --;
"Example No. 9", under the heading "Intermediate layer...", in the vertical column ""Mn" 0.0" should read -- 0.8 --;
"Example No. 10", under the heading "Core material...", in the vertical coulmn "Fe", "0.0" should read -- 0.6 --; and
Under the heading "Intermediate layer...", in the vertical column "Mn", "0.0" should read -- 0.8 --.
"Example No. 11", under the heading "Intermediate layer...", in the vertical column "Mn", "0.0" should read -- 0.6 --.
"Example No. 12", under the heading "Intermediate layer...", in the vertical column "Mn", "0.0" should read -- 0.6 --.
"Example No. 15", under the heading "Intermediate layer...", in the vertical column "Ti", "1S" should read -- 15 --.

UNITED STATES PATENT AND TRADEMARK OFFICE
CERTIFICATE OF CORRECTION

PATENT NO. : 6,063,510
DATED : May 16, 2000
INVENTOR(S) : Inabayashi et al.

It is certified that error appears in the above-identified patent and that said Letters Patent is hereby corrected as shown below:

"Example No. 16", under the heading "Intermediate layer...", in the vertical column "Ti", "1S" should read -- 15 --.

Columns 11 and 12,
Under the heading "Corrosion resistance", the vertical column heading which reads "of 500 hrs" should read -- after lapse of 500 hrs --; and
"Example 20 of the present invention", in the vertical column reading "after heating (Mpa)", "145" should read -- 146 --.

Columns 13 and 14,
Table 3, "Brazing Sheet", under the heading "Core material...", "No. 39," in the vertical column "Si", "0.1" should read -- 0.2 --;
Under the heading "Core material...", "No. 42", in the vertical column "Si", "0.1" should read -- 0.2 --.
Under the heading "Corrosion resistance", the heading "Maximum depth of pit corrosion (µs)" should read -- Maximum depth of pit corrosion (µm) --.

Columns 15 and 16,
Table 4, "Brazing Sheet", under the heading "Core material...", No. 5,", in the vertical column "Ti", "1.15" should read -- 0.15 --;
Under the heading "Core material...", "No. 8,", in the vertical column "Fe", "0.2" should read -- 0.6 --;
Under the heading "Intermediate layer...", "No. 13", in the vertical coulmn "Zn", "12.1" should read -- 12.0 --;
Under the heading "Intermediate layer...", "Clad thickness (µs)" should read -- Clad thickness (µm); --;
Under the heading "Corrosion resistance", the heading "Maximum depth of pit corrosion (µs)" should read -- Maximum depth of pit corrosion (µm) --.

Columns 17 and 18,
Under the heading "Corrosion resistance...", Example No. 16, in the vertical column "press-forming (mm)", "7.95" should read -- 8.01 --;
Under the heading "Corrosion resistance...", Example No. 29, in the vertical column "press-forming (mm)", "830" should read -- 8.30 --.

UNITED STATES PATENT AND TRADEMARK OFFICE
CERTIFICATE OF CORRECTION

PATENT NO. : 6,063,510
DATED : May 16, 2000
INVENTOR(S) : Inabayashi et al.

It is certified that error appears in the above-identified patent and that said Letters Patent is hereby corrected as shown below:

<u>Column 19,</u>
Line 56, "hereinafter" should read -- (hereinafter --.

Signed and Sealed this

Fifth Day of March, 2002

*Attest:*

*Attesting Officer*

JAMES E. ROGAN
*Director of the United States Patent and Trademark Office*